Jan. 20, 1959 C. W. BRITCHER 2,869,482
DUSTING METHOD AND EQUIPMENT
Filed Feb. 3, 1953 3 Sheets-Sheet 1
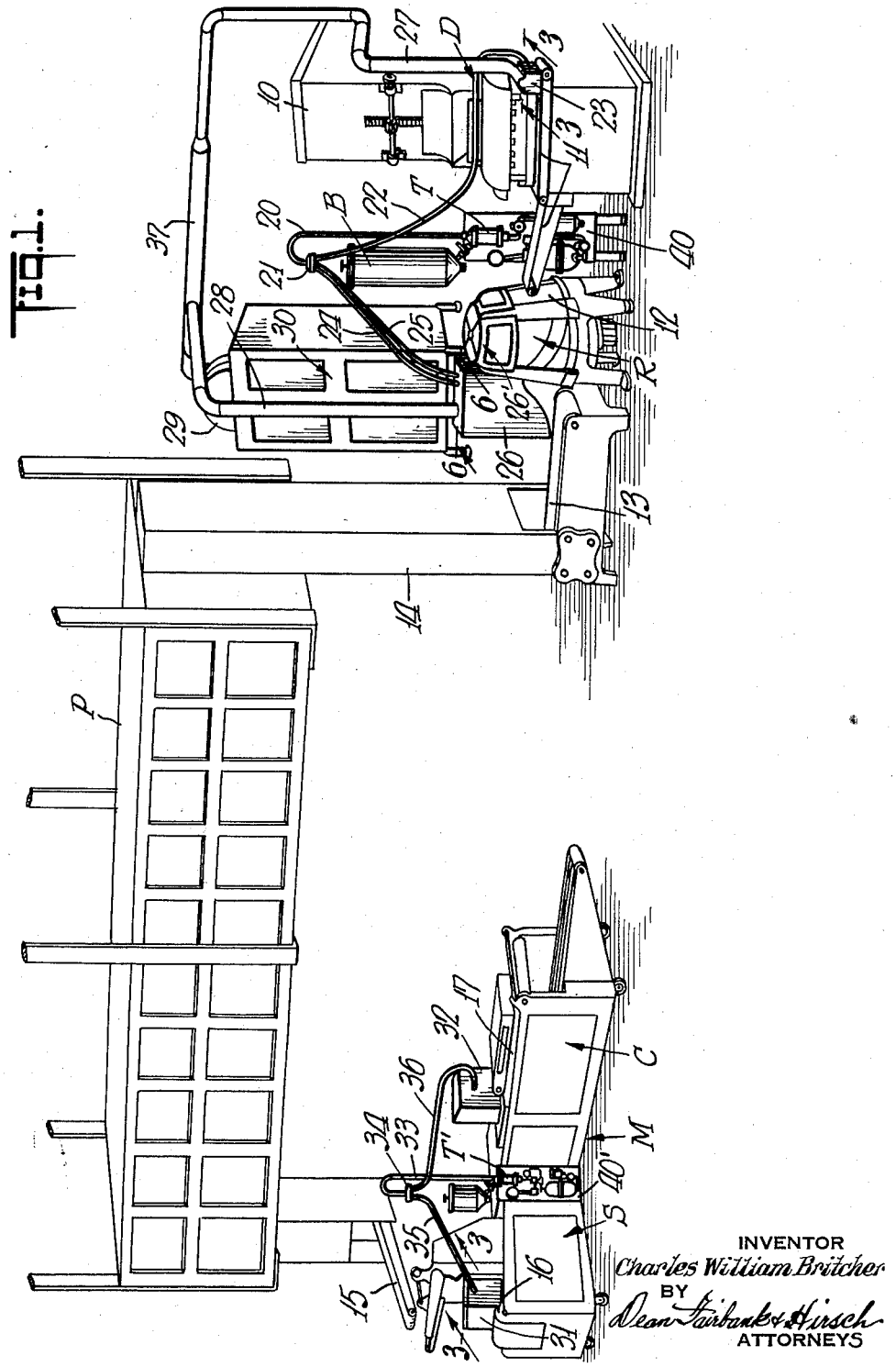
INVENTOR
*Charles William Britcher*
BY
*Dean Fairbank & Hirsch*
ATTORNEYS

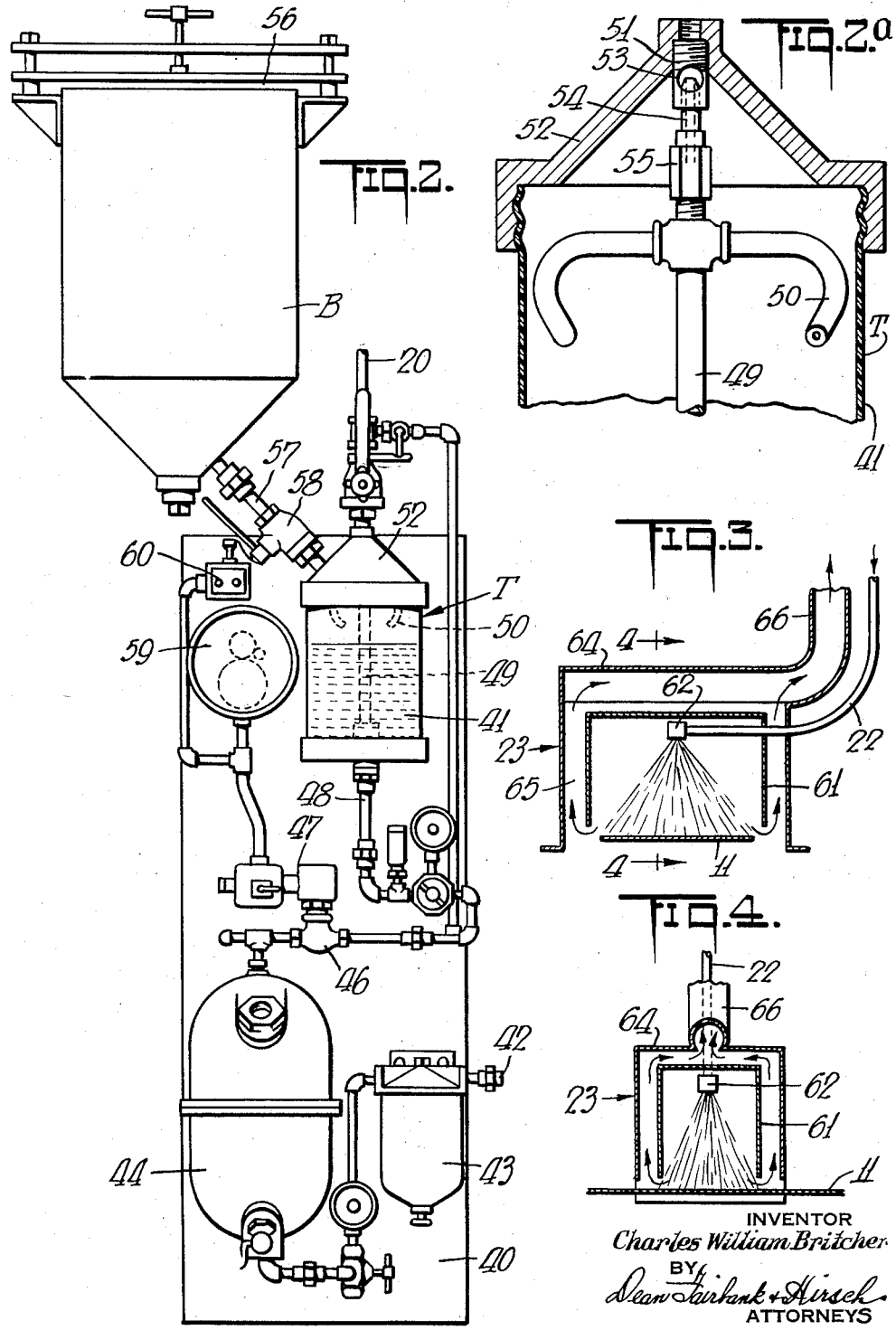

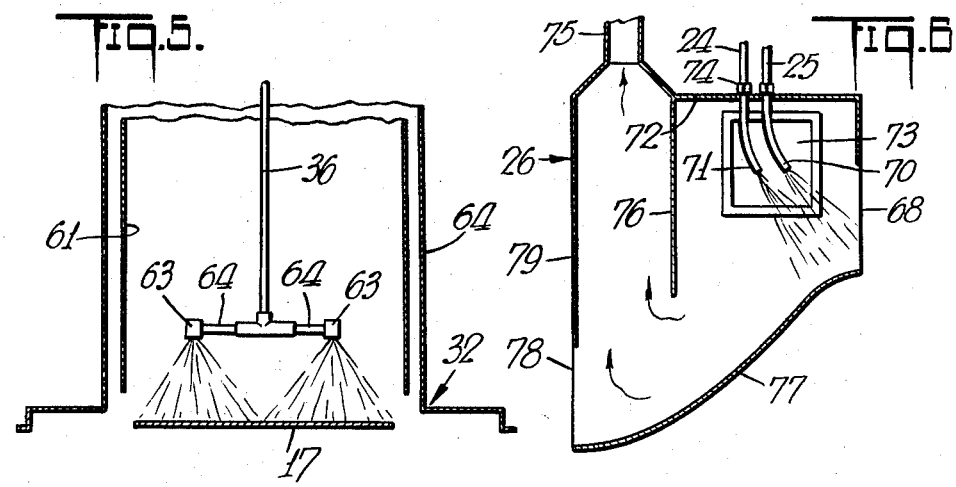
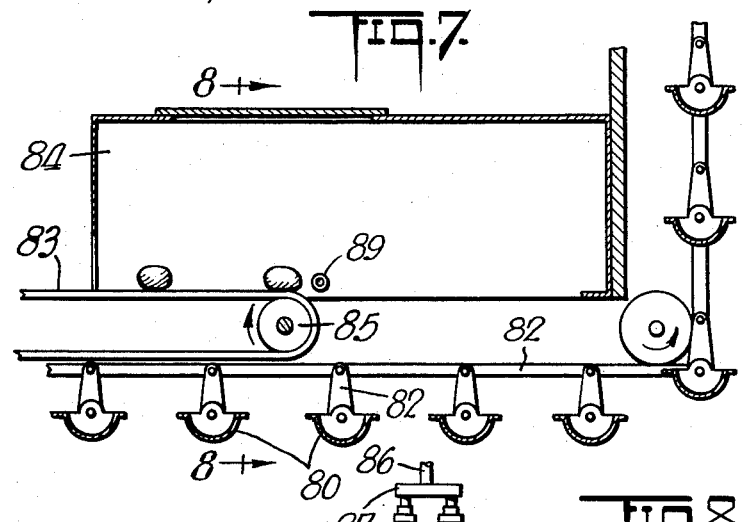
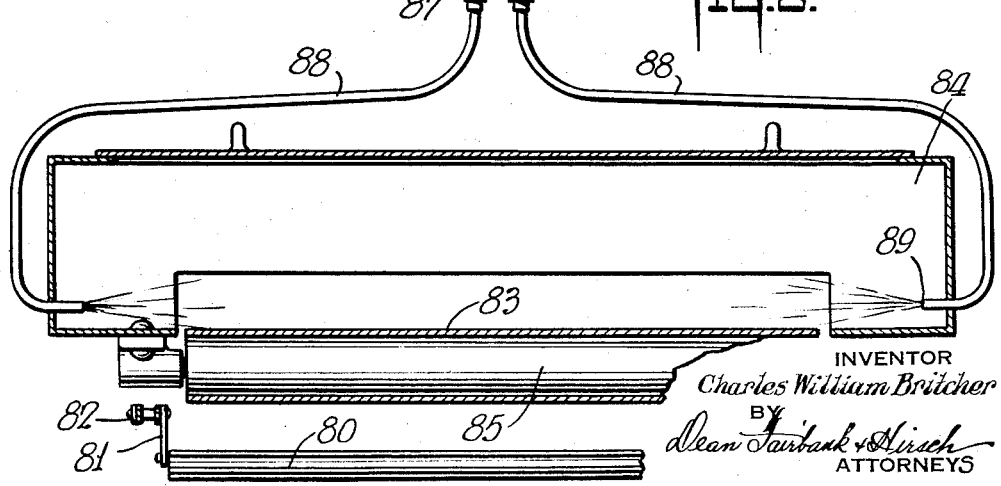

United States Patent Office 2,869,482
Patented Jan. 20, 1959

2,869,482

DUSTING METHOD AND EQUIPMENT

Charles William Britcher, Glen Ridge, N. J., assignor, by mesne assignments, to Wm. Walter Frankel, Charles William Britcher and Herbert Cole, New York, N. Y., trustees Application February 3, 1953, Serial No. 334,915

3 Claims. (Cl. 107—9)

The present invention relates to the art of food manufacture, more particularly to the dusting of individual portions of food product, generally for the purpose of preventing adhesion while in moist or tacky condition in the course of processing, one important application being to the make-up procedure preparatory to entering the oven in the mass production of bakery products including bread of various types, rolls, biscuits, cakes and pies.

The conventional mode of use of flour as a dusting medium in bakeries has many objections, among which are the following:

(a) The use of flour sifted onto the dough portions is uneconomical for three reasons:
　(i) Since flour readily mixes with the water in the dough, a relatively large amount of flour is required for each portion, especially of loose or wet dough, to assure the requisite dryness for preventing adhesion to the make-up equipment,
　(ii) The rapid accumulation of excess powder in the proofer and other make-up equipment necessitates frequent cleaning operation, and
　(iii) Much powder escapes into the air, settles on all surfaces throughout the make-up department and is lost, and causes respiratory illness due to floating dust.

(b) Flour is subject to insect infestation especially in the overhead proofer and also throughout the make-up department and this necessitates preventative sanitation measures, such as the use of insecticides and fumigants, entailing the need for particular caution in food processing plants;

(c) As most of the moisture in the dough is subsequently evaporated in the baking oven, the flour used for dusting reverts substantially to raw flour which accounts for swirls, cores and dust holes frequently appearing on the inside of the loaf or other bakery product, and also results in objectionable dust marks on the crust.

It is among the objects of the invention to provide a method and equipment that is simple, and not likely to become deranged, by which the dough pieces in their travel through the make-up equipment, may be uniformly and adequately dusted with the use of powder in volume, but a small fraction of that required where flour is used, wherein the need for frequent cleaning is obviated, wherein there is no loss of dusting powder in the atmosphere, and consequently no respiratory difficulty and no waste of powder anywhere in the plant, wherein there is no likelihood of insect infestation, and the need for insecticides or fumigants is eliminated, and by the use of which swirls, cores or dust holes within the bread or the bakery product and dust marks on the crust of such product are avoided.

Although starch, such as corn starch, as a dusting medium in lieu of wheat flour for baker's dough during processing, is known to have certain advantages, among which are that it will not support insect life, the use of starch for such purpose has not heretofore been regular commercial practice, for the reason that corn starch tends to pack, lump or agglomerate when it is attempted to sift it upon the dough pieces, so that the required even distribution of such dusting powder is not attainable.

According to one feature of the present invention, the use of starch as a dusting medium has been rendered highly practical on a commercial scale by entraining the dry starch powder from a tank in a stream of air directed toward and collected in dusting chambers near and in communication with each of those portions or stations of the make-up equipment where dusting is required, thereby to assure uniform adhesion of such powder over the exposed surface of the dough pieces.

According to another feature, suction is effectively applied at the dusting chambers to withdraw collected air with excess of entrained powder beyond that which is taken up by the equipment and the dough pieces carried thereby; the excess powder being thus recovered for re-use.

In a preferred mode of carrying the invention into execution, air, preferably dry air, blown into one or more service tanks containing the dusting powder, entrains powder thus stirred up therein to flow through conduits leading to the interiors of various dusting chambers, thereby establishing a cloud of powder in such chambers, from which the conveyors and dough portions become uniformly dusted.

For withdrawing from the dusting chambers adjacent the respective conveyors, the excess of powder beyond that which adheres thereto and to the dough pieces traveling therethrough, each dusting chamber is provided with a hood, to which hoods suction is applied to withdraw the excess powder with the air from between the edges of each conveyor belt and the associated dusting chamber to convey it through appropriate ducts to a suitable collector for re-use.

In mechanism in which the dough is subjected to the action of a rotor, as for instance in the rounder of bread-making equipment, the associated dusting chamber may communicate laterally through the casing with the interior of the rounder and may deliver the dough pieces from the rounder to pass to the proofer. The suction is applied to a duct at a part of such chamber remote from the rounder, a baffle such as a partition intervening between the powder inlet conduit and the suction duct.

In the accompanying drawings in which are shown diagrammatically one or more illustrative conventional makeup installations for bakeries, with the associated novel dusting equipment, Fig. 1 is a diagrammaitc perspective view of a more or less complete conventional make-up equipment for a bread bakery, showing in heavier lines the associated equipment for dusting according to the present invention, Fig. 2 is a front elevation partly in section and on a larger scale, showing equipment for storing and propelling the dusting powder, Fig. 2ª is a sectional view on a large scale of the upper part of the service powder tank, Fig. 3 is a view in transverse cross section, taken on line 3—3 of Fig. 1, showing the dusting chamber and associated parts at the region of conveyor belts of the make-up equipment, Fig. 4 is a transverse sectional view, taken on line 4—4 of Fig. 3, Fig. 5 is a fragmentary view of the powder feeding pipes and nozzle arrangement associated with a wider conveyor belt, such as that at the curler stage of a cross-grain molder, Fig. 6 is a view in transverse cross section, taken on line 6—6 of Fig. 1 of the dusting chamber adjacent the rounder, and on a larger scale, Fig. 7 is a sectional view of a dusting chamber and associated mechanism for the make-up equipment of a roll bake shop, and Fig. 8 is a transverse sectional view thereof, taken on line 8—8 of Fig. 7.

Referring now to the drawings, there is shown in Fig. 1 a generally conventional make-up equipment for a bread bakery. Briefly described, there is a divider D in which dough from a hopper 10 is cut into pieces for the individual loaves by conventional mechanism (not shown), from which the dough pieces drop upon a conveyor belt 11 which delivers laterally into the rounder R that comprises a casing 12 and having a conveyor in the form of a rotor therein. From the rounder, a conveyor 13 moves the successive dough pieces to an elevator 14 into the overhead proofer P, which has a long conveyor (not shown) that slowly moves the dough pieces in several lengthwise traverses to permit the dough to rise. From the far end of the proofer P, the dough pieces are lowered by conveyor 15 to molder M, shown as a cross-grain molder, the sheeter section S of which has a conveyor belt 16 that delivers to conveyor belt 17 in tandem therewith, of the curler section C, conveyor belt 17 in turn discharging the processed dough pieces for further processing and ultimate delivery to the baking oven (not shown).

The above briefly described equipment is entirely conventional and more or less typical of various designs of make-up equipment in the baking industry.

In the illustrative embodiment shown, the dusting equipment is shown in heavy lines. It illustratively comprises powder-containing service tank T adjacent the divider D and rounder R which is automatically replenished from one or more larger powder reservoirs or bins B.

Compressed air is desirably introduced into the service tank T in manner hereinafter more fully described, to set up a cloud of dry powder therein, the air being thence propelled with entrained powder through rising conduit 20 to a manifold 21 whence it passes by way of one pipe 22 to deliver powder-laden air to collect in a dusting chamber 23 which is adjacent to and delivers to the conveyor 11. Pipes 24 and 25 from manifold 21 deliver powder-laden air to collect in a dusting chamber 26, which is adjacent to and communicates with the interior of the rounder R and discharges the dough pieces from the rounder to the elevator 14. The dusting chambers and related elements will be described more fully below. Ducts 27 and 28 connected with respect to the dusting chamber 23 and 26, respectively, serve to convey excess dusting powder therefrom, to duct main 37 by suction applied to the end of said main by an appropriate suction fan 29 which discharges into a powder collector 30.

At the respective conveyors 16 and 17 of the molder, there are also dusting chambers 31 and 32, respectively, and these are generally similar to the chamber 23 at the divider D. While the powder for dusting chambers 31 and 32 may be derived from the same service tank T, as that for the dusting chambers 23 and 26, it is in general more practical to use a second service tank T' and propulsion system generally similar to that adjacent the divider and rounder, the rising conduit 33 from which leads to manifold 34 from which branches 35 and 36 deliver to dusting chambers 31 and 32 respectively. Ducts (not shown) similar to those at 27 and 28 apply suction to dusting chambers 31 and 32 from exhaust fan 29.

The dusting powder propulsion instrumentality comprises various elements desirably mounted upon panel 40 (Fig. 2) and is generally similar to that described in my recent Patent No. 2,614,538, dated October 21, 1952, though preferably with some modifications.

Briefly described, the powder service tank T desirably has a wall 41 of glass or lucite for visibility. The air from a pressure source (not shown) is admitted through inlet 42, passes through a filter 43 and thence through a suitable dehydrator 44, whence it proceeds by way of valve 46 controlled by a solenoid 47 through conduit 48 to a riser pipe 49 axially through and extending above the level of powder in the tank T. The riser pipe desirably has outwardly and downwardly obliquely extending curved outlet branches 50 blowing upon the top of the level of powder in the tank and thus setting up a cloud of dust within the tank T above the body of powder for expulsion therefrom with the entrained dry air through the pipe system 20 to 25.

Desirably, tank T has an aspirator which comprises a pipe fitting 51 axially mounted in the cover 52 with one or more aspirator ports 53 therein, adjacent the upper end of the aspirator jet 54 which is mounted within the tank by means of fitting 55 upon the upper end of the riser pipe 49. By this arrangement, as will be readily understood, the air stream blown upward through the aspirator jet will effectively entrain with it powder from the dust cloud set up within the upper part of the tank T.

The reservoir powder tank or bin B upon panel 40 has a sealed cover 56 and connects through the cover 52 of the service tank T by a pipe 57 which is normally shut off by valve 58. A timer switch 59 periodically shuts off air valve 46 by actuating solenoid 47, as long as microswitch 60 is manually closed by the manual turning of the lever to open valve 58, so that air trapped in the reservoir tank B above the supply of powder therein will in its escape propel powder therefrom into the service tank T to re-establish the desired level of powder therein. As long as valve 58 is left open, the time switch operates for periodic replenishment of the service tank. The more free-flowing the powder, the smaller the portion of the cycle for opening the valve 46, to effect replenishment of the service tank. The timer 59 is adjustable so that the valve 46 is open the requisite fraction of the time, substantially to maintain the desired level of powder in service tank T.

The equipment on panel 40 that supplies both the divider D and the rounder R is relatively capacious and desirably has two supply reservoirs or bins B of which only one is shown, so that replenishment of an exhausted reservoir or bin may be effected by shifting to the other reservoir or bin without shutting down operations.

The cross-grain molder M requires a relatively small amount of powder, usually only about 10 percent of the total powder used in the make-up equipment, and indeed with tight or dry dough such as rye dough, dusting thereat may sometimes be dispensed with, especially in dry weather. A relatively small panel unit 40', as shown in Fig. 1, is adequate for this purpose, which delivers powder to the cross-grain molder, and is of general construction similar to the larger unit on panel 40 used for the divider and the rounder.

Figs. 3 and 4 show the general construction of dusting chamber such as chamber 23, used at the divider D or chambers 31 and 32 at the cross-grain molder M, whereby powder is applied to a conveyor belt and to dough pieces moving thereon. The conveyor belt 11 in effect constitutes the bottom of the dusting chamber which may be an inverted rectangular box 61, desirably of stainless steel through the wall of which, desirably the end wall, extends the outer end of the air pipe 22 which has a suitable nozzle end 62 from which the powder fans downward and outward across the width of the belt and over any dough pieces carried thereon.

The belt 11 of the divider D and belt 16 of the sheeter element S of the cross-grain molder M are relatively narrow so that a single conventional nozzle 62 is adequate for spraying the effective width of the belt. The curler element C of the cross-grain molder M having a considerably wider conveyor belt 17, it is desirable to provide a pair of conventional nozzles 63 at the ends of opposed cross arms 64 discharging from pipe 36 for distribution over the effective width of such wider belt within its correspondingly wider dusting chamber 32 as shown in Fig. 5.

To prevent excess powder from being discharged into the ambient air and to collect and re-claim it, it is preferable to provide in association with each dusting chamber 23, 31 and 32, a hood 65, also desirably rectangular, affording an air space 65' about the exterior of the dusting chamber, each hood having a duct 66, preferably rising therefrom and communicating with the duct system 27, 37.

The hood 65 preferably extends somewhat below the lower edge of the box 61 of the dusting chamber, as shown, so that excess powder is effectively drawn upward and outward by suction generated by fan 29, and passes through the conduit system for accumulation in collector 30 of powder in excess of that taken up by the dough and the conveyor belts.

In practice the dry air which delivers powder to the make-up equipment is fed at rate in the order of 15 cubic feet per minute while the suction fan 29 at the collector 30 will feed at the rate in the order of 300 cubic feet per minute, so that the greater portion of air drawn by said fan is not delivered by pipe 20, but is ambient air sucked in from the exterior of the dusting chamber, and hence there is no likelihood of any dust escaping into the room. Yet the suction fan 29 will in nowise interfere with the effective and thorough dust coating of the dough pieces within the dusting chambers, the walls of which, together with the associated conveyor belt effectively baffling application of excessive suction to the interior of such dusting chamber.

The dusting chamber 26 mounted laterally against the casing 12 of the conventional rounder R communicates with the interior of the rounder through an appropriate port 68.

In carrying out the present invention, the usually open top of the rounder is closed by metal plates 26' which intervene between the standards of the rounder near the top and in conjunction form in effect a hood to prevent escape of powder to the air and to render more effective the suction applied for withdrawal of excess powder.

It is because a substantial amount of powder is required at the rounder R, more than by the rest of the make-up equipment, for effectively covering the portions of dough that are being shaped therein, that two or more nozzles 70, 71 fed from pipes 24, 25 are employed to assure adequate delivery of powder. These nozzles desirably enter through the roof 72 of such dusting chamber and are exposed to view through a panel 73 at its front. The pipe ends may be adjusted by turning the same in their mounting bushings 74, so that their outwardly turned nozzles may point directly toward the port 68 into the rounder or be more or less averted therefrom, depending on the dusting powder requirements of the particular dough being rounded.

A duct 75, preferably rising from the outer end of dusting chamber 26, communicates with the duct system 27, 37 that leads to the collector 30 for removal of excess powder. A baffle, desirably in the form of a partition 76, extends downward from the roof 72 of the dust chamber 26 and ends short of its curved bottom 77, while a port 78 in the lower part of the outer wall 79 of dusting chamber 26 serves as the exit for the dough pieces as they leave the rounder and have become adequately dusted within said dusting chamber 26 and thus dusted proceed on their way to the proofer. Thus, in operation, powder entrained with the air stream, enters the rounder R, adequately to dust the dough therein without interference from the suction fan 29 which effectively sucks ambient air through port 78 and draws away from the dusting chamber, excess powder beyond that taken up by the dough pieces passing through dusting chamber 26.

In Figs. 7 and 8 is shown an alternative embodiment for roll baking make-up equipment of conventional type, in which transverse rows of individual roll cavities 80 in a plate hingedly linked at 81 to a conveyor 82 are supplied by gravity from off the end of conveyor belt 83 for delivery to the proofer.

The dusting chamber 84 is a box similar to that shown at 61 in the other embodiment, under which the delivery pulley 85 of the conveyor belt 83 is located. Effectively to dust the entire line of dough pieces in the row of cavities 80, the air pipe 86 which conveys the entrained powder from the service tank T, desirably delivers through a manifold 87 to a pair of outlet lengths 88 entering through the opposite side walls of the dusting chamber 84 with horizontal nozzles 89 spraying dust across the row of dough-carrying cavities. The dusting chamber 84 is preferably equipped with means (not shown) similar to those previously described and withdrawing excess of powder beyond that taken up by the conveyor and the dough pieces thereon.

While the methods and systems above described have certain advantages even with the use of flour as the dusting powder, including particularly the uniformity of application and the recovery of excess powder beyond that which is taken up by the dough, the maximum advantage is attained where powdered starch, desirably fine corn and preferably fine wheat starch, is used instead of flour.

Since starch does not readily wet with water, it will settle out when mixed with water. Unlike the difficulties pointed out with the use of dusting flour, a reaction occurs in the oven with the use of dusting starch, much the same as in the gelation of corn starch pudding. In addition, the action of heat, acid or ferments, all three of which occur in the oven, results in the conversion of starch into dextrin and some of its sugar derivatives. This accounts for the elimination of cores, swirls and dust holes in the baked product where starch is used as the dusting medium. Moreover the use of such dusting medium further results in an improvement of color, thinness, tenderness and uniformity of crust.

In use of the system a make-up equipment for a bread bakery would in full-capacity operation, processing in the order of 100,000 pounds of dough in twenty-four hours, consume only in the order of 125 pounds of dusting starch, that is, one-eighth of 1 percent by weight of the dough being processed. This is but 20 to 25 percent of the weight of dusting powder consumed, where flour rather than starch is used for the purpose.

In practice, the dust supplying equipment on panels 40 and 40' would be adjusted so that the feed of powder is at rate not greatly in excess of that actually consumed. The air propelling pressure at the service tank T for a tight or dry dough would ordinarily be 2 to 2.5 pounds per square inch but might be as high as 6 to 8 pounds per square inch or even higher to deliver the greater amount of starch required for effective dusting of a loose or wet dough.

A dough piece dusted by the system of the present invention becomes uniformly coated over its entire surface with substantially the thinnest possible layer of starch and substantially without excess. The dough thus becomes entirely dry to the touch and non-sticky and will not shed starch in ordinary handling. The blowing of an excessive amount of starch through the pipe system 20 to 25 would not materially increase the amount of powder applied to the dough, but would render operation more cumbersome by necessitating more frequent emptying of the collector 30.

By reason of the fact that starch affords a diet for insects, which is wholly inadequate to admit of their propagation, the use of starch as a dusting medium dispenses entirely with the need for insecticides or fumigants.

There is no need for cleaning the proofer, although it is desirable to remove the few pounds of dusting starch that may accumulate therein after some weeks of continuous operation. Such removal once every six weeks or so of continuous 24-hour use is adequate. This is to be contrasted with the need for cleaning at least weekly, resorted to where flour is used as the dusting powder.

The procedure and equipment for drawing excess starch beyond that which is taken up by the dough pieces from the dust chambers to a collector, avoids the accumulation of dust and starch throughout the make-up department and avoids respiratory difficulties to the workers since the air is not powder-laden where the present method and equipment are used.

While the invention has been described particularly in its application to the make-up equipment of a bread or roll bakery, it is understood that it applies also to sweet doughs such as biscuits, cake, pies or the like. The invention also has application in somewhat analogous relations where the food product is moist or tacky in the course of processing, as for instance for dusting marshmallows, grain pulled mints and chewing gums in the confectionery industry. It also has application to other food products, such for instance, as for dusting meats or the like with mono-sodium glutamate or similar preparations.

While one illustrative embodiment of conventional bread make-up equipment and a fragment of a roll make-up equipment have been shown and described, it will be understood that the invention may be applied to equipments of any character for such general use. For any application there would be a dust chamber of the general character described at each of the locations where dusting is required, all fed from one or more sources of dusting powder and pneumatic pressure. In general but one dusting chamber is required at each of those elements of the make-up equipment that require dusting. That dusting chamber replaces two or more sifting chambers at each element, that are commonly used by the prior art.

It will of course be understood that for certain types of rounder a hood similar to that shown in Figs. 3 and 4 could be employed in lieu of the construction shown in Fig. 6.

As many changes could be made in the above method and equipment and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. In a bread rounder of the type comprising a casing and a rotor therein, means for effecting dusting of dough pieces at said rounder, said means comprising a housing laterally of and against said rounder with a port communicating through said casing with the rotor therein, one or more inlet pipes through the top of said housing for entraining dry dusting powder, pneumatically to set up a cloud of powder in the housing and delivering thence to the dough pieces passing through the rounder, and further dusting the dough pieces upon discharge through said port into the housing, a duct spaced from the rounder, a partition extending downward from the top of said housing between said duct and said inlet pipes, and means for applying suction to said duct, said housing having a port for discharge of the rounded and dusted dough pieces therefrom and serving for admission of air under suction.

2. The method of dusting individual pieces of baker's dough in the course of their movement through the rounder and to the proofer in the make-up equipment of a bakery plant, which comprises entraining dry starch in comminuted form within a stream of dry air, collecting such air adjacent the rounder, directing some of such collected air with entrained powder into the rounder, and passing the dough pieces from the rounder through the region of collected air for further dusting of the dough pieces in transit toward the proofer.

3. The method of dusting individual pieces of baker's dough in the course of their movement through the rounder and to the proofer in the make-up equipment of a bakery plant, which comprises entraining dry starch in comminuted form within a stream of dry air, collecting such air adjacent the rounder, directing some of such collected air with entrained powder into the rounder, and passing the dough pieces from the rounder through the region of collected air for further dusting of the dough pieces in transit toward the proofer, while applying suction to withdraw collected air with excess starch entrained therewith beyond that which adheres to the rounder and in transit toward the proofer.

References Cited in the file of this patent
UNITED STATES PATENTS

| | | |
|---|---|---|
| 903,584 | Kohler | Nov. 10, 1908 |
| 1,248,629 | Davidson | Dec. 4, 1917 |
| 1,582,382 | Collis | Apr. 27, 1926 |
| 2,242,182 | McCann | May 13, 1941 |
| 2,375,766 | Britcher | May 15, 1945 |
| 2,382,657 | Olgiati | Aug. 14, 1945 |
| 2,501,047 | Gustafsson | Mar. 21, 1950 |
| 2,505,243 | Hewitt | Apr. 25, 1950 |
| 2,608,446 | La Pota | Aug. 26, 1952 |
| 2,614,528 | Britcher | Oct. 21, 1952 |
| 2,616,766 | Sanborn | Nov. 4, 1952 |
| 2,648,295 | Greenberg | Aug. 11, 1953 |

OTHER REFERENCES

Bakers Helper (Magazine), Sept. 16, 1950, pages 57 and 109 (published by Cissold Publishing Company, 105 West Adams Street, Chicago 3, Ill.).